J. A. WILSON.
VALVE.
APPLICATION FILED SEPT. 16, 1913.
1,093,514.
Patented Apr. 14, 1914.
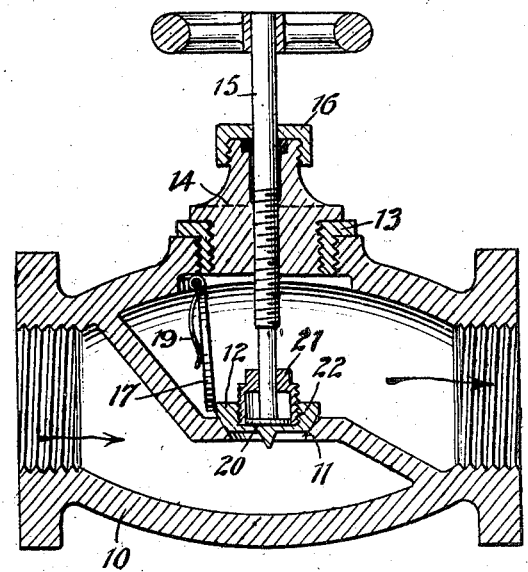
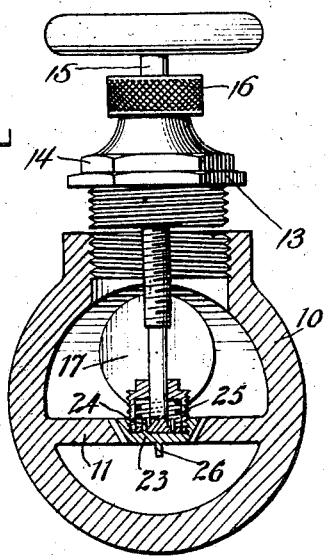
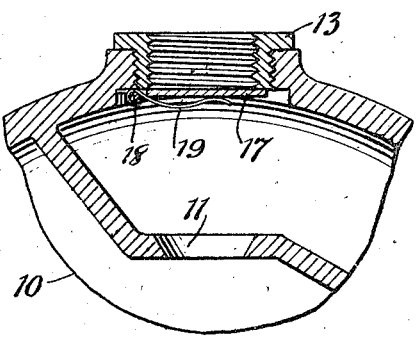
WITNESSES
INVENTOR
John A. Wilson
BY
ATTORNEYS

UNITED STATES PATENT OFFICE.

JOHN A. WILSON, OF DETROIT, MICHIGAN, ASSIGNOR OF ONE-HALF TO GEORGE MOORE, OF DETROIT, MICHIGAN.

VALVE.

1,093,514.

Specification of Letters Patent.

Patented Apr. 14, 1914.

Application filed September 16, 1913. Serial No. 790,064.

*To all whom it may concern:*

Be it known that I, JOHN A. WILSON, a citizen of the United States, and a resident of Detroit, in the county of Wayne and State of Michigan, have invented a new and Improved Valve, of which the following is a full, clear, and exact description.

This invention relates to steam fitting or water distribution, and has particular reference to a novel form of valve having the capability of being repaired without the necessity for shutting off the flow of steam or other fluid through the main pipe.

More specifically stated, the primary object of the invention is to provide a valve body having a valve opening on one side, said opening to be closed by a special form of plug and bushing, the plug carrying the valve stem, and there being provided a pivoted check valve adapted to close automatically against the inner edge of the bushing when the valve is removed.

The foregoing and other objects of the invention will hereinafter be more fully described and claimed and illustrated in the drawings forming a part of this specification in which like characters of reference indicate corresponding parts in all the views, and in which—

Figure 1 is a longitudinal section of a device made in accordance with this invention, showing the valve closed; Fig. 2 is a transverse section of the same, but indicating the valve removed and a reamer applied to dress the valve seat; and Fig. 3 is a view corresponding to Fig. 1, but indicating the valve removed and the check valve closed.

The several parts of the device may be made of any suitable materials, and the relative sizes and proportions, as well as the general design of the mechanism, may be varied to a considerable extent without departing from the spirit of the invention hereinafter more fully set forth and specifically claimed.

The numeral 10 indicates any suitable form or design of valve body or casing through which a fluid is presumed to flow in the direction indicated by the arrows. Said casing is provided with a valve seat 11 to which is fitted a valve 12. The side of the valve casing opposite the valve seat is fitted with a screw threaded bushing 13 and into the bushing is tapped a plug 14 through which a valve stem 15 extends. A gland 16 provides a substantially tight joint between the valve stem and the plug, as is usual in this type of devices.

A check valve 17 of substantially disk form is pivoted at 18 adjacent the inner end of the bushing 13 and a spring 19 acts thereupon to cause the check valve to assume the position shown in Fig. 3 when the valve 12 and stem are removed,—in other words,—sealing the outlet which would otherwise exist through the bushing. The valve, however, may readily be forced inwardly through the bushing, causing the check valve to be moved out of the way against the tension of the spring 19, as shown in Fig. 1.

The means for connecting the valve to the valve stem is peculiar and comprises a head 20 formed on the inner end of the valve stem and having loose connection with the valve by means of a hollow nut 21 surrounding the valve stem and head and tapped into a pocket 22 formed in the outer side of the valve.

The valve is opened in the usual way by unscrewing the valve stem in the nut 14, the valve, however, holding the check valve open at all times when within the casing. Should the valve seat or valve require to be trued or dressed, the valve plug 14 will be unscrewed and thereby the valve will be removed from the valve body and plug, and the check valve 17 will close the opening as above set forth. The steam or other fluid may then pass freely through the main line as usual. The same valve stem is adapted to be used for the dressing of the valve seat by unscrewing the valve from the nut 21 and applying a reamer of the form shown at 23 to the same valve stem. Said reamer is preferably provided with one or more pins 24 adapted to project through as many holes in the head 20. A spring 25 is introduced between the head and the closed end of the nut 21 to cause the reamer to remain interlocked with the valve stem head for rotation therewith. The reamer as well as the valve is preferably provided with a projection 26 which serves to unseat the check valve preliminary to the introduction thereof into the passage through the valve casing. When the reamer is shoved into the valve seat it may be rotated by the valve stem freely for the purpose of truing or dressing the valve seat. Likewise the valve 12 may be dressed by any suitable means before being replaced. The bushing provides means for permitting the introduction of the check valve and it constitutes a seat therefor when the check valve is operated to close the outside opening of the casing.

Having thus described my invention, I claim as new and desire to secure by Letters Patent:—

In a valve of the character set forth, the combination of a valve casing having a valve seat and an opening opposite the same, a bushing secured in said opening, a check valve pivoted within the casing adjacent the inner edge of said bushing adapted to close said opening, a plug removably secured in said bushing, a valve stem passing through said plug, and a valve detachably connected to the inner end of said stem, said valve serving to normally hold the check valve open.

In testimony whereof I have signed my name to this specification in the presence of two subscribing witnesses.

JOHN A. WILSON.

Witnesses:
 WALTER A. THAYER,
 GEORGE MOORE.